(12) United States Patent
Strack et al.

(10) Patent No.: US 8,539,026 B2
(45) Date of Patent: *Sep. 17, 2013

(54) SOURCE IDENTIFICATION FOR MULTIPART CONTENT VALIDATION

(75) Inventors: Michael Anthony Strack, Austin, TX (US); Allen Keith Wilson, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,290

(22) Filed: Sep. 13, 2012

(65) Prior Publication Data

US 2013/0007116 A1   Jan. 3, 2013

Related U.S. Application Data

(63) Continuation of application No. 12/854,996, filed on Aug. 12, 2010.

(51) Int. Cl.
*G06F 15/16* (2006.01)
(52) U.S. Cl.
USPC ............................. 709/203; 709/224; 709/229
(58) Field of Classification Search
USPC ........................................................ 709/203
See application file for complete search history.

(56) References Cited

U.S. PATENT DOCUMENTS

| | | | |
|---|---|---|---|
| 6,684,224 B2 * | 1/2004 | Meding et al. | 1/1 |
| 8,060,598 B1 * | 11/2011 | Cook et al. | 709/224 |
| 8,220,064 B2 * | 7/2012 | Yamauchi et al. | 726/31 |
| 2003/0097454 A1 * | 5/2003 | Yamakawa et al. | 709/229 |
| 2008/0022416 A1 * | 1/2008 | Yamauchi et al. | 726/31 |
| 2009/0271474 A1 | 10/2009 | Fu et al. | |
| 2011/0289301 A1 * | 11/2011 | Allen et al. | 712/227 |

\* cited by examiner

*Primary Examiner* — Hua Fan
(74) *Attorney, Agent, or Firm* — Garg Law Firm, PLLC; Rakesh Garg; John Flynn (57) ABSTRACT

A method, system, and computer usable program product for source identification for multipart content validation are provided in the illustrative embodiments. An identification information of a source server is obtained by parsing an update request, the update request being configured to request from the source server an update of a part of the multipart content. The identification information is recorded. A change in a part of the multipart content is observed. The change in the part results in an updated multipart content. A debugging directive is constructed, the debugging directive including the identification information of the source server. The debugging directive is inserted relative to the part that has changed thereby associating the source server with the part of the multipart content. The updated multipart content including the debugging directive is transmitted to a validation server executing in a second data processing system.

20 Claims, 4 Drawing Sheets

SOURCE IDENTIFICATION FOR MULTIPART CONTENT VALIDATION

RELATED APPLICATIONS

Pursuant to 35 USC §120, this continuation application claims priority to and benefit of U.S. patent application Ser. No. 12/854,996, entitled "TRACKING Source Identification for Multipart Content Validation", filed on Aug. 12, 2010, the disclosure of which is incorporated herein in their entirety for all purposes.

The present invention is related to similar subject matter of co-pending and commonly assigned U.S. patent application Ser. No. 12/391,013 entitled "DOCUMENT SOURCE DEBUGGER," filed on Feb. 23, 2009, and U.S. patent application Ser. No. 12/752,676 entitled "CORRECTING DOCUMENT GENERATION FOR POLICY COMPLIANCE," filed on Apr. 1, 2010, which are hereby incorporated by reference.

BACKGROUND OF THE INVENTION

1. Field of the Invention

The present invention relates generally to an improved data processing system, and in particular, to a computer implemented method for validating information from a variety of sources in a data processing environment. More particularly, the present invention relates to a computer implemented method, system, and computer usable program code for source identification for multipart content validation.

2. Description of the Related Art

Data processing systems communicate with each other over a data network by requesting, providing, and updating data that represents content. Often, such content is dynamically generated by computer programs or applications rather than being static content. Furthermore, some content, such as a webpage, may be generated through a collaboration of several applications, where each application or an application component might contribute a part of the content. For example, Hypertext Markup Language (HTML) pages are often dynamically generated by executing server side applications or application components, such as JavaServer Pages (JSP), Servlet or Portlet.

Technology presently exists to assemble content, such as a webpage, from a variety of sources. Such technology supports a content source, such as a source server, to provide and update parts of the content, such as a part of the webpage, independent of other sources contributing to other parts of the content.

Data security is a concern in data processing environments. Typically, data leaving the data processing environment should comply with the security requirements of the data processing environment. The security requirements are typically implemented as security policies or rules in data processing environments. Similarly, security concerns arise with respect to the data that enters the data processing environment.

Other concerns also exist with respect to the data being exchanged in a data processing environment. For example, some content may have to comply with corporate governance or industry-specific guidelines for quality control, accessibility, security, or liability. Data processing environments may include content validation systems that may validate content for these and other reasons.

SUMMARY OF THE INVENTION

The illustrative embodiments provide a method, system, and computer usable program product for source identification for multipart content validation. An application executing in a data processing system, obtains an identification information of a source server by parsing an update request, the update request being configured to request from the source server an update of a part of the multipart content. The identification information is recorded. A change in a part of the multipart content is observed. The change in the part of the multipart content results in an updated multipart content. A debugging directive is constructed, the debugging directive including the identification information of the source server. The debugging directive is inserted relative to the part that has changed thereby associating the source server with the part of the multipart content. The updated multipart content including the debugging directive is transmitted to a validation server executing in a second data processing system.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Presently available technology, such as Web 2.0, enables assembling content from several sources, such as in a client web browser. For example, a client web browser may present a page that may include several parts. Some of the parts may receive content from different sources. For example, on a user's customized page, one source server may provide stock quotes, another source server may provide newsfeed, and a different source server may provide a view of the user's email account.

An application or an application component of any kind that contributes, generates, creates, compiles, arranges, transforms, translates, computes, modifies, updates, or otherwise manipulates content is a content source application within the scope of this disclosure. A content source application may also be referred to as simply a source, a source server, or a content server. Multipart content is content that has more than one part and where different parts are provided, updated, or otherwise manipulated by different source servers.

The invention recognizes that with multipart content, the problem of content validation has become more complex. Some solutions exist to correct errors in the content or detect failure of a content update process. However, the invention recognizes that such solutions are unsatisfactory for a variety of reasons.

For example, a type of solution adds attributes to blocks or parts of content. However, the attributes are effective only for identifying those parts of the content that can change. This type of presently available solution does not identify source servers of multipart content, nor can this type of solution assist with content validation.

Certain other solutions exist as add-ons to client side applications, such as in the form of web browsers plug-ins. These add-ons identify an error in the assembled content and seek to correct the error in the local version of the content being displayed at a particular time. When a part of the content changes, corrections in the local copy are lost, the content has to be reevaluated for errors, and corrections have to be re-applied to the updated content. This type of presently available solution also does not identify source servers of multipart content, and cannot assist an external content validation process that may provide server-side fixes.

Some solutions can trace a request for update from code in the content to a source server. For example, a solution of this type may trace an asynchronous Javascript and XML (AJAX) call from a script in a page to a source server. However, these solutions are designed to trace flow of the call and do not identify the content that may violate a policy or include other validation issues.

Presently available solutions fail to provide continuous association between changing content and one or more source servers that may be causing the change. Furthermore, such solutions do not provide this association information to external validation applications that may be able to effect server-side changes.

The invention recognizes that multipart content is generally not sourced from a single identifiable source. Furthermore, the invention recognizes that the multipart content identification information, such as the uniform resource locator (URL) displayed in a browser, as well as the source code for the page displaying the multipart content on a browser, may not change although the computer internal memory representation (data image, or page image) of the multipart content, such as Document Object Model (DOM) for the page displaying the multipart content on a browser, may have changed when a particular source server updates a particular part of the multipart content.

Therefore, the invention recognizes that either the source servers of the various parts of a multipart content are not readily identifiable, or a change to a part of the multipart content is difficult to associate with a source server, or both. For these and other reasons, the invention further recognizes that providing the information identifying content's source, together with the content as that content is changed by the source, to a validation application for ongoing content validation, is a problem that remains unsolved by the present technology.

The illustrative embodiments used to describe the invention generally address and solve the above-described problems and other problems related to multipart content. The illustrative embodiments of the invention provide a method, computer usable program product, and data processing system for source identification for multipart content validation. An embodiment of the invention may be implemented in conjunction with existing multipart content assembly application, such as a web browser. An embodiment of the invention may be implemented in conjunction with existing validation solutions, such as a validation server.

The illustrative embodiments are described with respect to data, data structures, and identifiers only as examples. Such descriptions are not intended to be limiting on the invention. For example, an illustrative embodiment described with respect to single part of content may be implemented using several parts of the content, in a similar manner within the scope of the invention.

Furthermore, the illustrative embodiments may be implemented with respect to any type of data processing system. For example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to a synchronous request and response for content update may be implemented in an asynchronous messaging environment within the scope of the invention so long as a way exists to identify corresponding asynchronous requests and response with one another.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
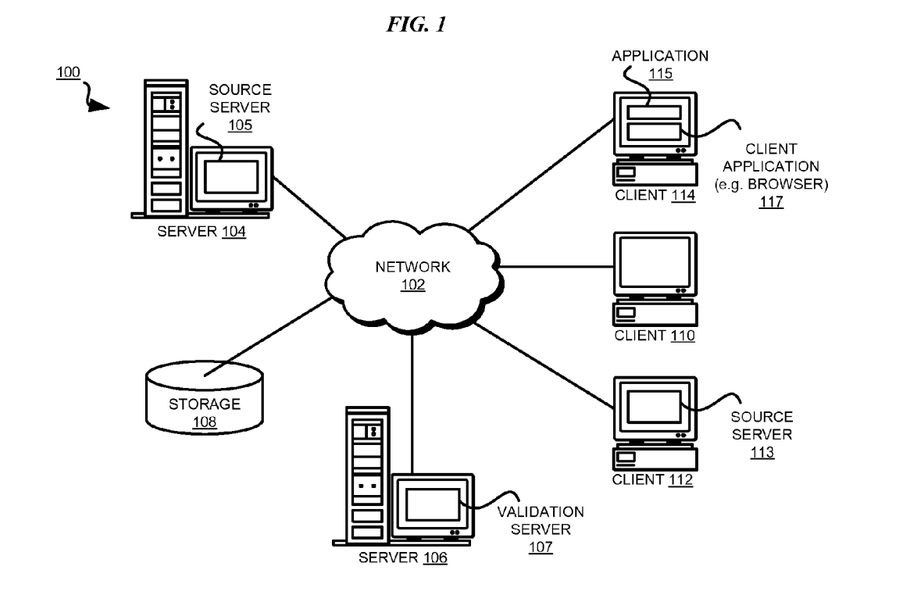
FIG. 1 depicts a pictorial representation of a network of data processing systems in which the illustrative embodiments may be implemented.
Figure 2:
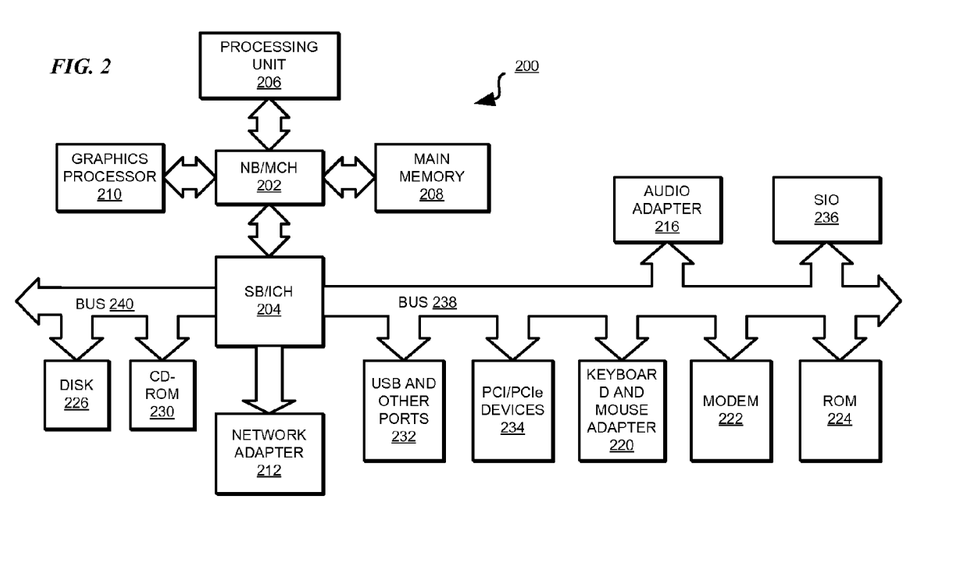
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include source server 105. Client 112 may include another source server, source server 113. Source servers 105 and 113 may provide content for different parts of a multipart content being used by client application 117. A web browser is an example of client application 117. Application 115 in client 114 may be an application implementing an embodiment of the invention. Validation server 107 in server 106 may be an external server, service, or application that validates content.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer-implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
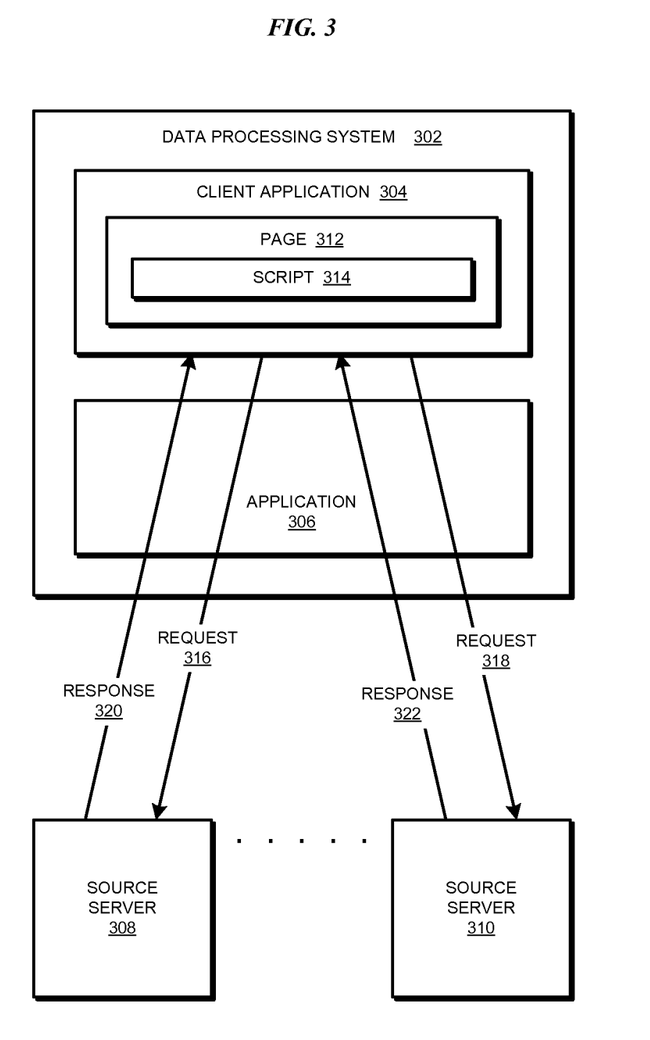
FIG. 3 depicts a block diagram of an example configuration for source identification for multipart content validation in accordance with an illustrative embodiment.

With reference to FIG. 3, this figure depicts a block diagram of an example configuration for source identification for multipart content validation in accordance with an illustrative embodiment. Data processing system 302 may be similar to client 114 and client application 304 may be similar to client application 117 in FIG. 1, such as web browser displaying a web page having multipart content. Application 306 may be an application according to an embodiment of the invention, and may be used as application 115 in FIG. 1, such as an add-on or a plugin to Application 304. Source servers 308 and 310 may each be a source server, such as source servers 105 and 113 in FIG. 1.

Page 312 may be a multipart content. Script 314 may be any code associated with page 312 for requesting new or updated content for one or more parts of the multipart content of page 312. For example, Script 314 may be a Java script running in a web browser.

Script 314 may be configured to communicate with any number of source servers. For example, script 314 may be configured to communicate with source server 308 using request 316 and with source server 310 using request 318. Script 314 may generate requests 316 and 318 by providing the information necessary to receive new or updated content for one or more parts of page 312. For example, in one embodiment, script 314 may provide an identifier and password along with a uniform resource locator (URL) of source server 308 in request 316. Script 314 may compose request 318 in same or different manner so long as request 318 can be directed to and processed by source server 310.

In response to request 316, source server 308 provides response 320. Source server 310 similarly responds to request 318 with response 322. Responses 320 and 322 may update one or more parts of the multipart content of page 312.

According to an embodiment, application 306 may monitor requests 316 and 318. Application 306 extracts and saves such information from requests 316 and 318 as is usable for identifying source servers 308 and 310. For example, if request 316 includes a URL for source server 308, application 306 parses request 318 generated from client application 304, retrieves the URL, and records the URL for use described later in this disclosure. Application 306 can similarly parse for, retrieve, and record any type of source server identifying information included in requests 316 and 318, such as internet protocol (IP) addresses and port numbers.

Responses 320 and 322 may be communicated from source servers 308 and 310 to client application 304 with or without the involvement of application 306. Once a response has been received at client application 304, client application 304 updates one or more parts of the multipart content of page 312. Application 306 then examines page 312 for changes in one or more parts of the multipart content therein.

By examining page 312's multipart content subsequent to a response, application 306 identifies the parts of the content that have been updated. If a part has been deleted as a result of a response from a source server, the deleted part is considered inconsequential to a validation process. Accordingly, application 306 ignores the deleted part and the request, such as request 316, that caused the deletion. If a part has new or changed content, application 306 associates that part with a request, such as request 316.

An embodiment of application 306 associates a change in content with a particular request based on the knowledge that multiple requests may not be outstanding simultaneously at a given time for the purpose of the intended multipart content validation. Thus, a request has a synchronous response that causes the change. In such an embodiment, the observed change in content can be attributed to the request that was outstanding immediately prior to the change. Accordingly, application 306 associates the source server identifier that application 306 parsed from, retrieved, and recorded from a request, such as request 316, with the observed change in one or more parts of the multipart content of page 312.

Note that application 306 does not require knowledge of the contents of a response, such as response 320 or 322, to determine which change in content is associated with which request, and consequently with which source server. The recorded source server identifier from a request is matched with the observed changes to parts of the contents, making the analysis of a source server's response unnecessary for source identification or content validation. In contrast, certain presently available solutions that track the content update requests from a client application disadvantageously rely upon the data in the responses from the source servers, and based on that data make a limited determination whether the request has succeeded or failed.

Figure 4:
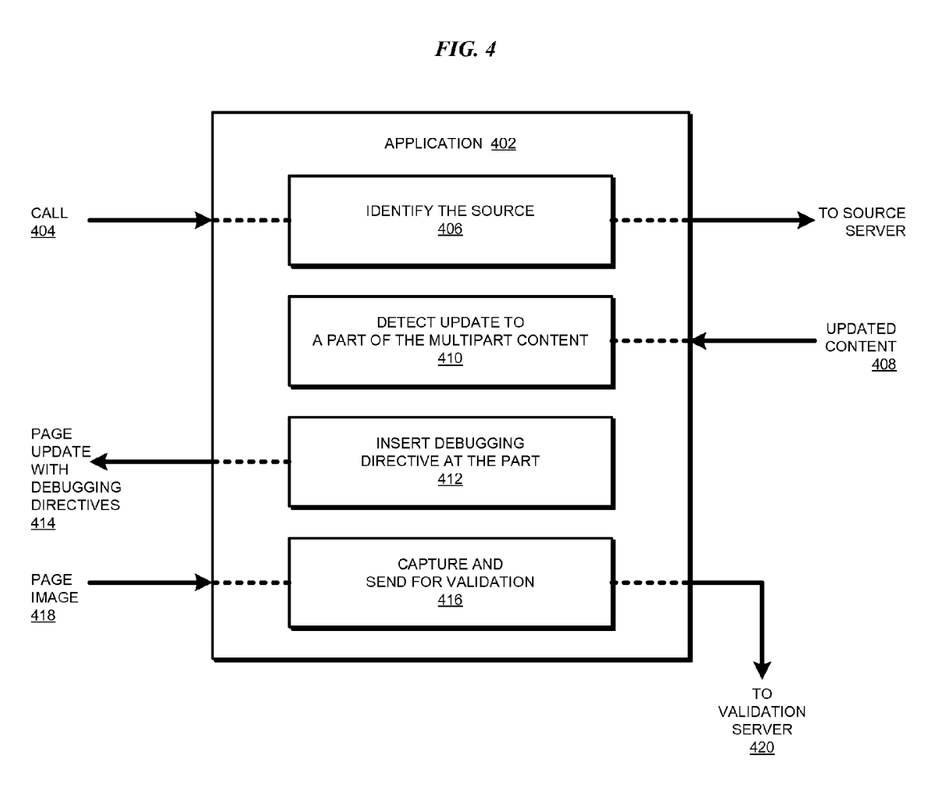
FIG. 4 depicts a block diagram of an example configuration of an application according to an illustrative embodiment.

With reference to FIG. 4, this figure depicts a block diagram of an example configuration of an application according to an illustrative embodiment. Application 402 may be analogous to application 306 in FIG. 3. Call 404 may be similar to request 316 or 318 in FIG. 3.

Component 406 in application 402 identifies the source server to which call 404 is directed. Call 404 is then communicated 408 to the source server.

In response to call 404, one or more parts of a multipart content is updated, such as by a client application. Application 402 receives updated multipart content 408. Component 410 of application 402 detects an update to a part of updated multipart content 408.

Detecting that a part has been updated can be accomplished in any suitable way. For example, comparing updated multipart content 408 with a previous version of the multipart content can reveal which parts of the multipart content has changed. A type of client application 304 in FIG. 3, such as a web browser, provides APIs for detecting content update events. Application 402 may use such APIs or alternate methods to detect the multiple content updates.

Component 412 inserts debugging directives at the changed parts. A debugging directive informs another application, such as a validation server, that the part associated with the debugging directive has to be examined. A debugging directive is constructed to include identifying information of the source server that provided the update. For example, a validation server may utilize a debugging directive for identifying the source server that provided the updated content, validate the updated content, and provide a server-side correction to the identified source server if the updated content does not satisfy a validation criterion.

A debugging directive may be one or more directives. For example, a debugging directive may be inserted before an updated part of a multipart content, and another debugging directive may be inserted after the updated part. A debugging directive may take any suitable form, and may be configured according to the external validation server's specification. For example, in one embodiment, a debugging directive may be inserted in the form of HTML comment lines that are distinctly identifiable as a debugging directive.

Component 412 may associate one or more debugging directives with one or more parts of updated multipart content 408. For example, a response may cause more than one part to change in updated multipart content 408. Accordingly, as an example, component 412 may insert debugging directives before and after each such changed part.

Having inserted one or more debugging directives, application 402 provides page update 414 to a client application that is using the multipart content. Page update 414 includes the debugging directives suitably associated with the updated parts of updated multipart content 408.

Component 416 captures computer internal memory representation, page image 418, of the page content resulting from page update 414. Component 416 sends captured page image 418 for validation, such as to validation server 420.

Figure 5:
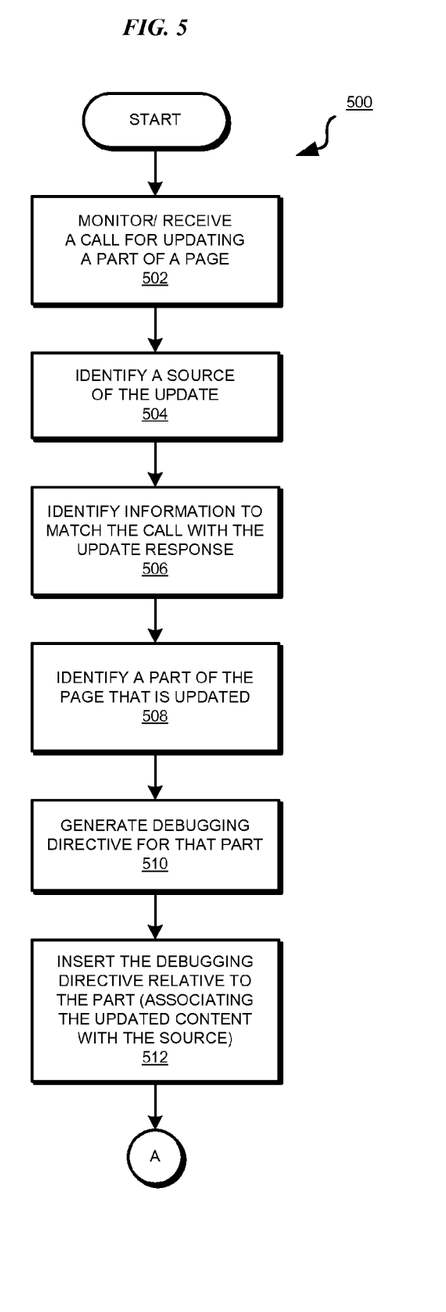
FIG. 5 depicts a flowchart of a process of source identification for multipart content validation in accordance with an illustrative embodiment.

With reference to FIG. 5, this figure depicts a flowchart of a process of source identification for multipart content validation in accordance with an illustrative embodiment. Process 500 may be implemented, for example, in application 402 in FIG. 4.

Process 500 begins by monitoring or receiving a call for updating a part of a multipart content (step 502). For example, in one embodiment, process 500 may monitor all calls or requests for updates being generated from a client application. In another embodiment, process 500 may receive select calls from which to parse the source server's identifying information.

Process 500 identifies a source of the requested update from a call of step 502 (step 504). In one embodiment, process 500 may additionally identify information for synchronizing the call with a corresponding response, such as when multiple calls can be simultaneously outstanding (step 506).

Process 500 identifies a part of the page that is updated subsequent to the call of step 502 (step 508). Process 500 generates a debugging directive for that part (step 510). The debugging directive includes the source server's identifying information as described elsewhere in this disclosure.

Process 500 associates the updated part with the source server by inserting the debugging directive relative to the part (step 512). Process 500 may then exit at exit point marked "A" and enter another process, such as process 600 in FIG. 6, having a corresponding entry point marked "A".

Figure 6:
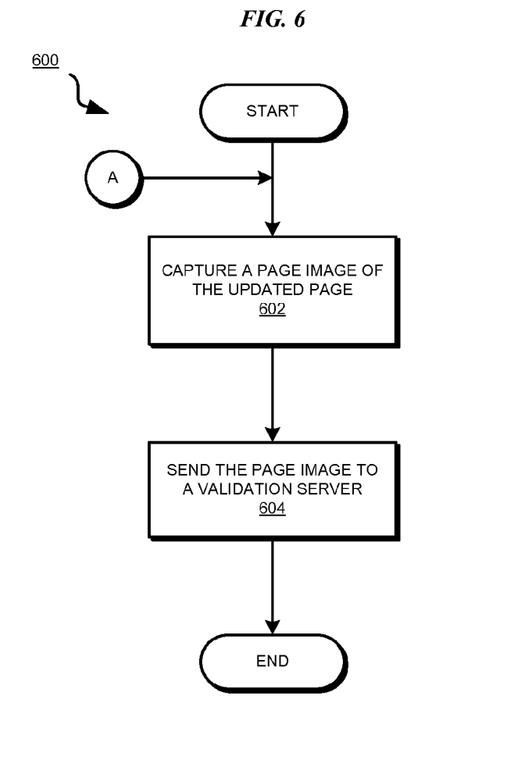
FIG. 6 depicts a flowchart of a process for validating updated parts of a multipart content in accordance with an illustrative embodiment.

With reference to FIG. 6, this figure depicts a flowchart of a process for validating updated parts of a multipart content in accordance with an illustrative embodiment. Process 600 can be implemented in application 402 in FIG. 4.

Process 600 being by capturing an computer internal memory representation (page image) of the updated page (step 602). The page includes the multipart content. The page image of the updated page may be, for example, the Document Object Model (DOM) of the page being displayed by a browser. The page image includes debugging directives, such as those inserted at step 512 in FIG. 5. Another process, such as process 500 in FIG. 5 may also enter process 600 at step 602 via entry point marked "A".

Process 600 sends the page image to a validation server (step 604). Process 600 ends thereafter. The validation server may then perform any suitable validation operation on the page image and may take any suitable corrective or notification action as may be suitable for a particular implementation.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for source identification for multipart content validation. Using an embodiment of the invention, various sources supplying content updates to one or more parts of multipart content can be identified. The identifying information of a source server is encoded as debugging directives relative to the part that source server updates. The updated page image, which includes the multipart content as well as the debugging directives, is supplied to an external validation server.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for source identification for multipart content validation, the computer implemented method comprising:

obtaining, at an application executing in a data processing system, an identification information of a source server by parsing an update request, the update request being configured to request from the source server an update of a part of the multipart content;

recording the identification information;

observing a change in the part of the multipart content, wherein the change in the part of the multipart content results in an updated multipart content;

constructing a debugging directive, the debugging directive including the identification information of the source server;

inserting the debugging directive relative to the part that has changed thereby associating the source server with the part of the multipart content; and transmitting the updated multipart content including the debugging directive to a validation server executing in a second data processing system.

2. The computer implemented method of claim 1, further comprising:

loading the updated multipart content including the debugging directive in a client application; and capturing a computer memory representation of the loaded updated multipart content including the debugging directive from the client application, the computer memory representation forming a page image, wherein the transmitting transmits the page image to the validation server.

3. The computer implemented method of claim 1, wherein the inserting the debugging directive inserts a first debugging directive before the part and inserts a second debugging directive after the part in the updated multipart content.

4. The computer implemented method of claim 1, wherein the observing further comprising:

receiving the updated multipart content from the client application; and comparing the updated multipart content with a previous version of the multipart content.

5. The computer implemented method of claim 1, wherein the change is caused by a response to the update request from the source server, and wherein the change in the part of the multipart content is detected without analyzing a response to the update request from the source server.

6. The computer implemented method of claim 1, wherein a first part of the multipart content receives update from a first source server in response to a first update request, a second part of the multipart content receives update from a second source server in response to a second update request, and wherein the first and the second update requests are asynchronous.

7. The computer implemented method of claim 1, wherein the identification information is a uniform resource locator (URL) of the source server.

8. The computer implemented method of claim 1, wherein the obtaining results from monitoring update requests originating from the client application.

9. A computer usable program product comprising a computer usable storage device including computer usable code for source identification for multipart content validation, the computer usable code comprising:

computer usable code for obtaining, at an application executing in a data processing system, an identification information of a source server by parsing an update request, the update request being configured to request from the source server an update of a part of the multipart content;

computer usable code for recording the identification information;

computer usable code for observing a change in the part of the multipart content, wherein the change in the part of the multipart content results in an updated multipart content;

computer usable code for constructing a debugging directive, the debugging directive including the identification information of the source server;

computer usable code for inserting the debugging directive relative to the part that has changed thereby associating the source server with the part of the multipart content; and computer usable code for transmitting the updated multipart content including the debugging directive to a validation server executing in a second data processing system.

10. The computer usable program product of claim 9, further comprising:

computer usable code for loading the updated multipart content including the debugging directive in a client application; and computer usable code for capturing a computer memory representation of the loaded updated multipart content including the debugging directive from the client application, the computer memory representation forming a page image, wherein the transmitting transmits the page image to the validation server.

11. The computer usable program product of claim 9, wherein the computer usable code for inserting the debugging directive inserts a first debugging directive before the part and inserts a second debugging directive after the part in the updated multipart content.

12. The computer usable program product of claim 9, wherein the computer usable code for observing further comprising:

computer usable code for receiving the updated multipart content from the client application; and computer usable code for comparing the updated multipart content with a previous version of the multipart content.

13. The computer usable program product of claim 9, wherein the change is caused by a response to the update request from the source server, and wherein the change in the part of the multipart content is detected without analyzing a response to the update request from the source server.

14. The computer usable program product of claim 9, wherein a first part of the multipart content receives update from a first source server in response to a first update request, a second part of the multipart content receives update from a second source server in response to a second update request, and wherein the first and the second update requests are asynchronous.

15. The computer usable program product of claim 9, wherein the computer usable code is stored in a computer readable storage medium in a data processing system, and wherein the computer usable code is transferred over a network from a remote data processing system.

16. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

17. A data processing system for source identification for multipart content validation, the data processing system comprising:

a storage device including a storage medium, wherein the storage device stores computer usable program code; and a processor, wherein the processor executes the computer usable program code, and wherein the computer usable program code comprises:

computer usable code for obtaining, at an application executing in a data processing system, an identification information of a source server by parsing an update request, the update request being configured to request from the source server an update of a part of the multipart content;

computer usable code for recording the identification information;

computer usable code for observing a change in the part of the multipart content, wherein the change in the part of the multipart content results in an updated multipart content;

computer usable code for constructing a debugging directive, the debugging directive including the identification information of the source server;

computer usable code for inserting the debugging directive relative to the part that has changed thereby associating the source server with the part of the multipart content; and computer usable code for transmitting the updated multipart content including the debugging directive to a validation server executing in a second data processing system.

18. The data processing system of claim 17, further comprising:

computer usable code for loading the updated multipart content including the debugging directive in a client application; and computer usable code for capturing a computer memory representation of the loaded updated multipart content including the debugging directive from the client application, the computer memory representation forming a page image, wherein the transmitting transmits the page image to the validation server.

19. The data processing system of claim 17, wherein the computer usable code for inserting the debugging directive inserts a first debugging directive before the part and inserts a second debugging directive after the part in the updated multipart content.

20. The data processing system of claim 17, wherein the computer usable code for observing further comprising:

computer usable code for receiving the updated multipart content from the client application; and computer usable code for comparing the updated multipart content with a previous version of the multipart content.

* * * * *